(No Model.)
2 Sheets—Sheet 1.
W. N. MURDOCK.
EPICYCULAR TIRE.
No. 588,872.     Patented Aug. 24, 1897.
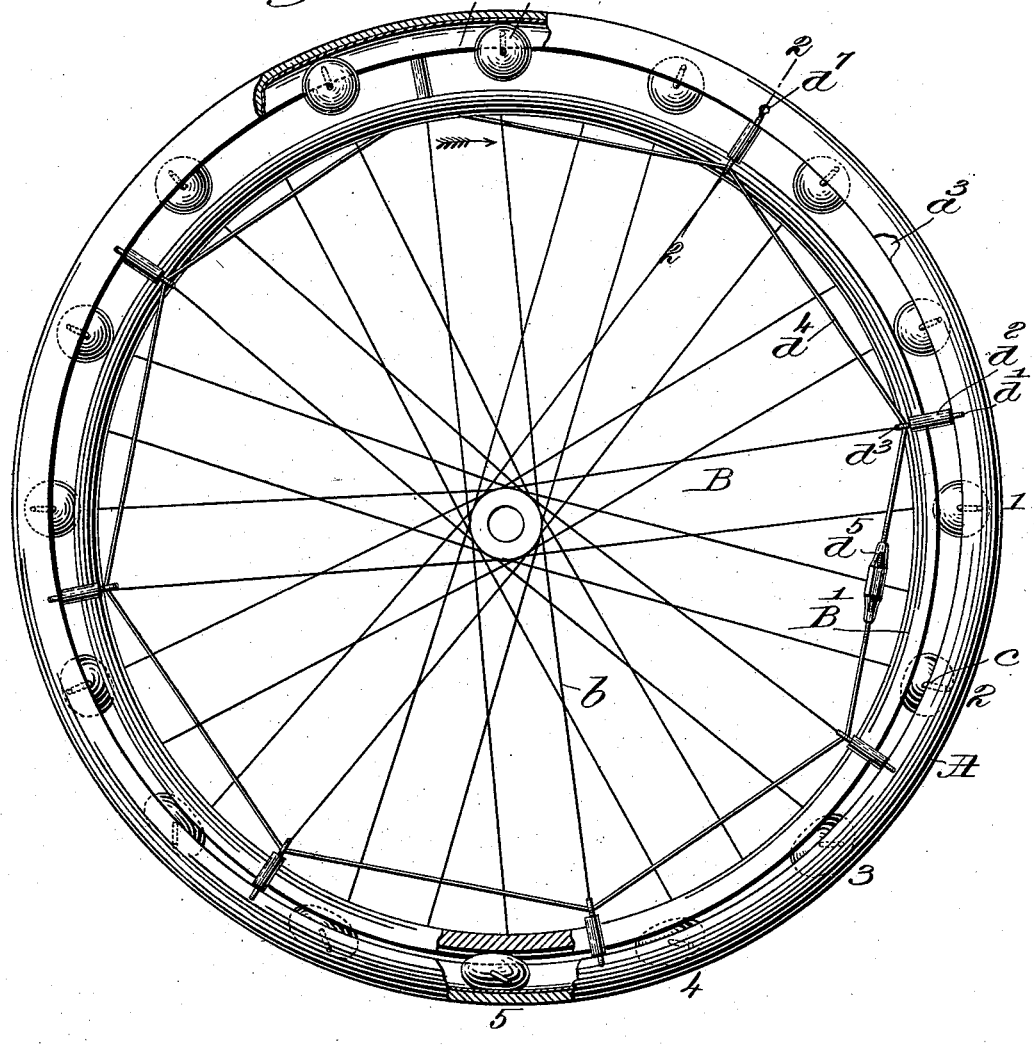
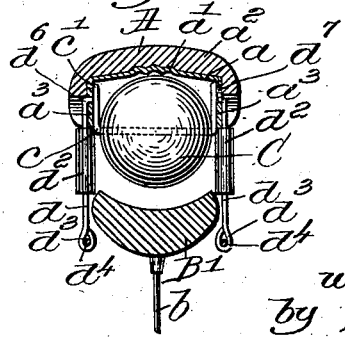
Witnesses:
Fred S. Greenleaf.
Thomas J. Drummond
Inventor.
William N. Murdock.
by Crosby & Gregory
Attys.

(No Model.) 2 Sheets—Sheet 2.
W. N. MURDOCK.
EPICYCULAR TIRE.
No. 588,872. Patented Aug. 24, 1897.
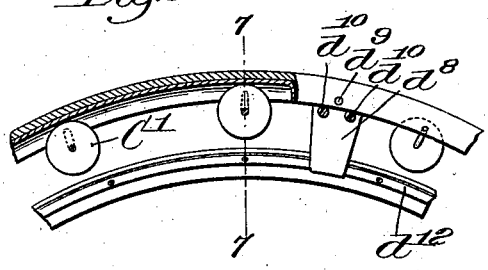
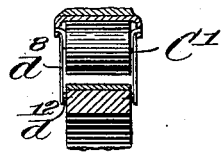
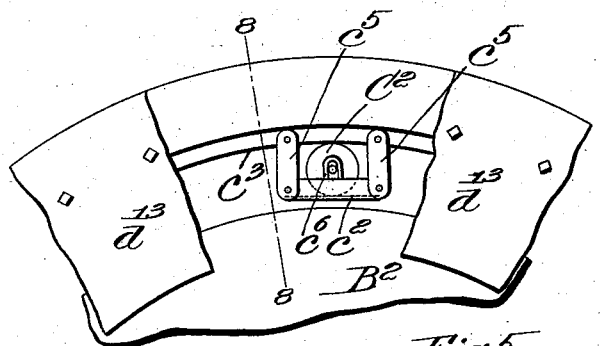
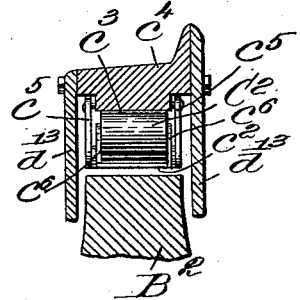
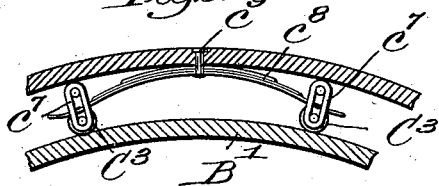
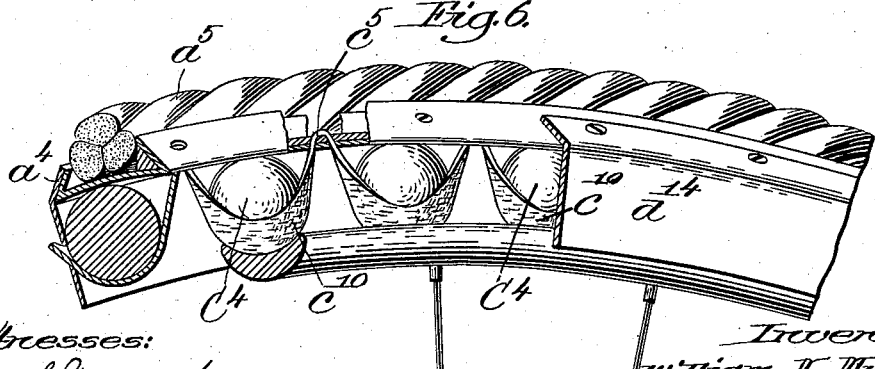

UNITED STATES PATENT OFFICE.

WILLIAM N. MURDOCK, OF BOSTON, MASSACHUSETTS.

EPICYCULAR TIRE.

SPECIFICATION forming part of Letters Patent No. 588,872, dated August 24, 1897.

Application filed May 3, 1897. Serial No. 634,804. (No model.)

*To all whom it may concern:*

Be it known that I, WILLIAM N. MURDOCK, of Boston, in the county of Suffolk and State of Massachusetts, have invented an Improvement in Epicycular Tires, of which the following description, in connection with the accompanying drawings, is a specification, like letters and figures on the drawings representing like parts.

My invention is an improvement in cushioned or spring tires; and it consists, substantially, of a supplementary rim or tire surrounding the felly of a wheel and carrying an annular system of independent springs or buffers upon its inner periphery, capable of yielding tangentially without friction for the normal travel of the wheel and upon which the said felly may ride. The various devices heretofore proposed have all practically failed either from insufficient resiliency or the development of great internal resistance against propulsion.

In order to show the full purpose and utility of my invention, it is pertinent to state that all forms of cushion-tires, including the pneumatic tubular devices in common use upon bicycles, are in principle, though not in form, epicycular, and that with all such tires the mechanical principle is involved of a shorter periphery riding upon a longer, the two having different axes of rotation. It is therefore manifest that if the two must be revolved in contact the periphery having the smaller diameter will require to make in traversing a given horizontal distance a greater number of revolutions than the other and that if this difference of revolution is not permitted freely strain or friction must result. It will also readily appear that this effect will be proportional to the adjustment of three factors (the radial diameter, the resiliency, and the resistance to tangential compression) found in the tire. The remedy for this difficulty is the employment of frictionless elastic rollers between the felly and a freely-rotating outer tire. It is also important that the motion of such rollers should be limited and that they should automatically maintain their relative positions on the wheel.

My invention consists in the arrangement and government of a series of elastic balls or rollers so as to constitute a novel and efficient elastic track between the felly and the outer rim of an epicycle free from either the friction or the tangential strains, as the case may be, which characterizes all the present forms of cushion-tires heretofore in use. When balls are used, I make them preferably of rubber or of a composition of rubber. When I use rollers, I prefer to make them partly of rubber or rubber fabric and of steel or other metal, as hereinafter shown. In either case I attach them to the rim or to the felly, so that in action each is independently movable through a small part of the arc of rotation—that is to say, capable of being at once compressed and rolled between the felly and the rim. This motion is limited, however, since it is not desirable that there should be any difference of rotation between the rim and the felly except that which arises from their peripheral inequality, as loss of motion and injury to parts would otherwise result, especially when motive power is applied within the wheel's circumference. Provision is also made for the return automatically of the balls or rollers to their original position when released from compression.

The details of the attaching device differ according to the size and weight of the wheel and the purposes for which it is intended, but its operation is in all cases the same.

The details and further advantages of my invention will be more fully hereinafter set forth, reference being had to the accompanying drawings, and the invention will be more particularly defined in the appended claims, forming a part of this specification.

In the drawings, Figure 1 in side elevation, parts being broken away, shows one embodiment of my invention in operative relation to an ordinary wheel, the drawing illustrating the same as it would appear under a load. Fig. 2 is a vertical transverse section taken on line 2 2, Fig. 1. Figs. 3, 4, 5, and 6 are fragmentary views, partially in section, showing various embodiments for carrying out my invention. Fig. 7 is a transverse section on line 7 7, Fig. 3. Fig. 8 is a transverse section on line 8 8, Fig. 4.

It is the object of my invention to overcome the resistance to forward movement of the tendency of a cushioned tire to pile up in front of the point of contact with the roadway and to permit the outer or tread portion of the running-gear to creep or climb forward relatively to the driving portion of the wheel and yet prevent the latter from moving backward relatively to the roadway. Accordingly, to that end I provide a tire A, which may be of any variety desired, the form herein shown being merely a convenient operative embodiment which I have chosen best to illustrate my invention, and mount this tire on the wheel or running-gear B of the vehicle, a bicycle-wheel being shown in Fig. 1, having the usual tangential spokes $b'$ and concaved felly or rim $B'$, in the hollow of which the tire A is free to travel. The details of construction of the latter will be clearly apparent from the sectional view shown in Fig. 2, where $a$ designates a continuous support, preferably metallic, extending around the wheel and preferably U-shaped in cross-section, also preferably having a plurality of corrugations $a'$, in order to give it additional strength and rigidity, on which is secured a tread-covering $a^2$, of rubber or other substance desired.

For the purpose of giving great rigidity to the tire I prefer to make the depending sides $a^3$ of considerable relative depth, thereby acting as trusses to bear a considerable portion of the strain and load of the vehicle and transmit the same to a number of the balls, rollers, buffers, or other devices, which may be used between the rim and felly to constitute my elastic track, as will be presently explained. In Figs. 1 and 2 I have shown this elastic track as formed by a plurality of yielding balls C, which may be of rubber, solid or hollow, or any other yielding material, these balls being suspended between the rim and felly, being herein shown as hung from the former by means of stirrups or loops $c$, passed horizontally through the axes of the balls and permanently pivoted at their outer free ends $c'$ to the rim.

In use the tire will be compressed toward the felly at its lower portion in contact with the ground and will be more or less removed away from the felly at its upper portion, the maximum removal or expansion being at the highest point of the wheel or opposite the point of greatest compression. Each time the wheel goes around on the ground the tire A creeps up on the felly $B'$ a short distance, and in time the former travels entirely around the latter.

If the balls were spaced loosely between the rim and felly, they would gradually collect together and cause a great amount of friction against each other and against the adjacent parts, and, on the other hand, if the balls were immovably secured in their respective positions they would offer practically the same tangential resistance to the forward movement of the wheel that is offered by a usual tubular pneumatic tire. In fact, it has been proposed to have resilient rings, balls, and springs interposed between a rim and felly, both loosely and in fixed immovable relation, the result in either case being as stated. According to my invention, however, there is no resistance offered whatever to the desired forward movement of the vehicle, and yet all the advantage of the cushion effect of the pneumatic tire is secured. Viewing Fig. 1, it will be seen that the lowermost ball (shown in full lines at the broken-away portion of the figure) is considerably compressed and that the three successive balls to the right thereof are also somewhat compressed, the compressing movement of the felly against the rim of the tire throwing the tire and felly eccentric to each other, so that any one point—as, for instance, at $B'$ on the felly—is moved downwardly relatively to the point of the tire which was opposite the same when the tire and felly were concentric, and this downward movement of the felly relatively to the tire carries the inward or free end or side of the several balls downward frictionally with it, the stirrups $c$ freely swinging to permit this necessary movement, so that while the stirrup at 1, Fig. 1, is exactly radial, as are also all those above it, the next stirrup below it at 2 is deflected slightly from the true radial line, and the next one at 3 is still more deflected, while that at 4 is considerably inclined, and that at 5 or the bottommost stirrup is most inclined, this being due to the fact that there is necessarily a constant downward movement of the felly relatively to the forward portion of the tire as the wheel progresses over the ground, the felly and tire being the closest together at the bottommost part, and as the bottommost part of the revolving wheel is constantly changing and moving forward with the moving wheel it follows, as I have stated, that the downward movement of the felly constantly swings the successive balls on their stirrups, as shown at 1 to 5, as the said balls successively come into those positions, the balls turning slightly on their axes and also flattening out more or less, as required.

The stirrups are made just long enough to permit the requisite movement, as above described, without permitting the felly opposite point 5 to travel backward any relatively to the tire or ground at that point, for it will be evident that if the balls were in the positions shown and there were no stirrups or retaining devices and the rim should be held immovable the felly could be freely rotated around and around within the tire, traveling readily on the latter as an endless track provided with a ball-bearing surface; but my invention permits just the necessary amount of movement of the balls to enable the felly to move downward at its forward portion the requisite amount which it must move to avoid the friction and no more, there being a constant friction between the compressed balls and the felly, preventing the latter from rotating backward.

Viewing Fig. 1 at the left-hand side thereof, it will be evident that from the point 5 rearwardly the felly begins to diverge from the tire, thereby releasing the compression of the balls and permitting them eventually to regain their original positions, the successive stirrups of these balls becoming less and less inclined until they are again radial to the tire and so remain until they again get around below the point 1 in the further progress of the wheel.

The forward creep of the tire relatively to the felly, or as it should, perhaps, more properly be stated, the downward movement of the latter relatively to the tire, is a continuous one, never ceasing so long as the wheel revolves and any load is borne thereby, the tire revolving, for instance, ninety-eight times while the wheel revolves one hundred. The point that I wish clearly understood is that the tendency to this relative movement invariably takes place in every pneumatic tire of whatever construction, but that the tire, being as a rule rigidly held on the felly of the wheel, cannot thus move, and therefore the resistance of this tendency is so much impedance to the progress of the wheel.

While I have described the arrangement shown in Fig. 1 in order to give a clear understanding, I wish it understood that I am in no wise restricted thereto and that while the stirrup is a convenient means for suspending and retaining the balls in their proper relative positions and bringing them back thereto when they have passed the lowermost point yet any other suitable means may be employed, whether rigid or yielding and whether swinging or not, the requirement being only that the balls shall not move farther than necessary, according to the requirements above stated, and that they shall be brought back to their original positions as they pass over the upper portion of the wheel, ready to again accomplish their office as they pass under the same; nor do I restrict myself to balls nor to a yielding medium. Also, I wish it understood that it is within the scope of my invention to retain the buffers, rollers, balls, or other sustaining devices C on the felly or otherwise, the only restriction in the broad construction of my invention being that these members C shall be free to yield with a relative movement, as indicated and described with reference to points 1 to 5, Fig. 1, and shall be automatically brought back to their original positions before they again get around to the point 1 in the travel of the wheel.

In Figs. 3 and 7 I have shown my invention adapted to carriages or road-vehicles heavier than bicycles, the rollers $C'$ being used instead of the balls (shown in Fig. 1) to constitute the sustaining members, these rollers being suspended by a stirrup the same as before, and in Figs. 4 and 8 I have shown a construction adapted to still heavier vehicles—as, for instance, cars—a steel roller $C^2$, covered, for instance, with leather, being shown carried between a plate $c^2$ and an upper bearing-surface $c^3$ of the rim of the tire, the latter having a usual steel flanged tread $c^4$, the plate $c^2$ being suspended at each end by links $c^5$ in parallel-ruler fashion and the roller $C^2$ being retained in place by straps $c^6$, passed about its trunnions, so that as the roller comes around toward the lowermost position it will flatten slightly and roll slightly between the plate $c^2$ and the surface $c^3$, the plate serving as a powerful friction-surface between the wheel-body $B^2$ and the roller, preventing the car-wheel from turning backward and at the same time preventing the roller $C^2$ from being stripped.

In Fig. 5 I have provided non-elastic rollers $C^3$, hung from links or straps $c^7$ and having a spring $c^8$, which is secured at $c^9$, bearing against their upper surfaces, as shown in the figure, and maintaining the rollers constantly against the felly of the wheel, so that the rollers will roll between the spring and felly.

In Fig. 6 I have shown a construction in which the sustaining members are shown in the form of balls $C^4$, freely suspended without being pivoted in any sense, but are simply carried in loops or hammocks $c^{10}$, preferably made of fabric, suspended at intervals from a rim $a^4$, the latter being slitted at suitable intervals to permit the fabric to be threaded therethrough, as indicated at $c^5$.

The latter construction permits the balls to yield freely to any relative movement of the tire over the wheel, to which the use of the wheel may give a tendency, the balls being in constant contact with the rim and yet entirely independent and disconnected therefrom. The balls may revolve in their loops, turning one way or another very slightly each time as they recover from their compression when on the ground.

I have thus pointed out various embodiments of my invention or means for carrying out the same in order that the true scope of my invention might be clearly apprehended.

In order that the tire may be neatly and firmly retained in position, I have shown in Figs. 1 and 2 guards on each side of the tire, extending radially thereto and made in the form of wires $d$, hooked or secured at their upper ends at $d'$ and having short pieces of tubing $d^2$, preferably rubber, mounted thereon preferably to revolve freely whenever they come in contact with the felly, these wires $d$ having eyes $d^3$ at their inner ends, through which a wire $d^4$ may be inserted about the wheel, suitable tightening means being provided at its ends, herein shown as a turnbuckle $d^5$, so that the wire $d^4$ may be drawn as tightly as desired, constituting a tension device not only to maintain all the guards rigidly, but also materially strengthening and supporting the tire, making it absolutely impossible that the latter should spread from any cause. These wire guards $d$ are simply hooked into the rim $a$, as indicated at $d^6$, Fig. 2, or they may be provided with a flanged button and inserted through an enlarged opening having a narrow neck, through which the button may be pulled, as indicated at $d^7$, Figs. 1 and 2.

In Figs. 3 and 7 I have shown the guard as in the form of a plate $d^8$, pivoted at $d^9$ and having stop-screws $d^{10}$, so that by removing the screws the plate may be swung to one side, so as to permit the tire to be taken from the wheel, strips $d^{12}$, of rubber or other friction material, being secured to the wheel for the plate $d^8$ to bear against.

In connection with the car-wheel construction I have shown continuous annular plates $d^{13}$, bolted to one of the relatively-moving parts to act as guards, and in Fig. 6 I have shown a somewhat similar construction at $d^{14}$. The latter figure, in addition to the features already described, is provided with a rim or tread carrier $a^4$, concaved on its inner side next the balls and having a trough formed in its outer side, a rope tread $a^5$ being held taut in said trough, the spiral tread provided thereby being an exceedingly practical construction for preventing slipping.

I do not herein specifically claim the details of construction of certain of the forms of my invention shown above, inasmuch as these embodiments in their specific construction are made the subjects-matter of other applications.

Having fully described my invention, what I claim, and desire to secure by Letters Patent, is—

1. The combination with a wheel-felly, of a tire independent of the said felly, a series of independently-movable members between said tire and felly, and means for permitting said members to have limited movement longitudinally of the tire, as the tire and felly are pressed together and moved relatively to each other, due to the revolution of the wheel, and to recover said members from their said longitudinal movement when the felly and tire are not pressed together, substantially as described.

2. The combination with a wheel-felly, of a rigid tire therefor independent thereof, and a plurality of sustaining members between said tire and felly, spaced apart from each other throughout the circumference of the wheel, said members being independently rotatable and having a limited swinging movement relatively to each other and the adjacent parts, substantially as described.

3. The combination with a wheel-felly, of a rigid tire therefor independent thereof, and a plurality of sustaining members between said tire and felly, means to permit said members to move toward each other when pressed between the tire and felly and to restore said members to uniformly-spaced-apart relation when they cease to be pressed between the same, substantially as described.

4. The combination with a wheel-felly, of a rigid tire therefor independent thereof, and a plurality of resilient sustaining members between said tire and felly, means to permit said members to move toward each other when pressed between the tire and felly, and to restore said members to uniformly-spaced-apart relation when they cease to be pressed between the same, substantially as described.

5. A tire provided with a series of independent rotatable sustaining members permanently spaced apart along its inner side, and suspending devices securing said members to the inner side of said tire, said suspending devices permitting the said members to have a limited swinging movement relatively to the tire, substantially as described.

6. The combination with a wheel having a concave felly, of a circumferential series of sustaining members freely movable on said concave felly, a tire beyond and engaging said members, said tire being concave on its inner side next said members and having a trough formed in its outer side, and a tread held taut in said trough, substantially as described.

In testimony whereof I have signed my name to this specification in the presence of two subscribing witnesses.

WILLIAM N. MURDOCK.

Witnesses:
GEO. H. MAXWELL,
GEO. W. GREGORY.